United States Patent [19]

Breeden

[11] Patent Number: 5,222,247

[45] Date of Patent: Jun. 22, 1993

[54] METHOD FOR MAXIMIZING CHANNEL SELECTION IN A COMMUNICATION SYSTEM

[75] Inventor: Robert L. Breeden, Boynton Raton, Fla.

[73] Assignee: Motorola, Inc., Schaumburg, Ill.

[21] Appl. No.: 590,758

[22] Filed: Oct. 1, 1990

[51] Int. Cl.⁵ .......................... H04B 1/00; H04Q 7/00
[52] U.S. Cl. ........................................ 455/26.1; 455/1;
455/67.3; 375/1; 379/59; 380/6
[58] Field of Search .................. 455/1, 26.1, 33, 34.1,
455/34.2, 52–56, 63, 67, 33.1–33.4, 52.1–52.3,
53.1, 54.1, 54.2, 55.1, 56.1, 67.1, 67.3; 375/1;
379/59, 63; 380/6

[56] References Cited

U.S. PATENT DOCUMENTS

| | | | |
|---|---|---|---|
| 3,688,195 | 8/1972 | Muller | 455/34.1 |
| 3,946,315 | 3/1976 | Tustison | 455/34.2 |
| 4,013,958 | 3/1977 | Spayth | 455/32.1 |
| 4,334,322 | 6/1982 | Clark, III | 455/1 |
| 4,570,265 | 2/1986 | Thro | 455/56 |
| 4,736,453 | 4/1988 | Schloemer | 455/56 |
| 5,044,010 | 8/1991 | Frenkiel | 379/63 |
| 5,093,924 | 3/1992 | Toshiyuki et al. | 455/62 |

Primary Examiner—Salvatore Cangialosi
Attorney, Agent, or Firm—Keith Chanroo; William E. Koch; Thomas G. Berry

[57] ABSTRACT

A communication system (100) has at least one base site (204) which includes a plurality of transceivers (110A-C) operating on a plurality of communication channels for communicating to at least one of a plurality of communicators (108). The at least one base site (204) comprises a generator (210) generating a plurality of interference signals according to a predetermined pattern on a subset of the plurality of communication channels. A processor (208) initiating and terminating communication between the base site (204) and the at least one communicator (108) on a selected communication channel substantially free of interference signals. The processor (208) further determines the communication channel being selected, and determines whether to change the predetermined pattern of the plurality of interference signals. The processor (208), coupled to said generator (210), steers other initiating communicators (108) to communication channels substantially free of interference by altering the predetermined pattern of interference signals. The altering of the predetermined pattern comprises selectively enabling and disabling interference signals subsequent to the initiation and termination of the communication between the base site (204) and the at least one communicator (108).

14 Claims, 9 Drawing Sheets

METHOD FOR MAXIMIZING CHANNEL SELECTION IN A COMMUNICATION SYSTEM

FIELD OF THE INVENTION

This invention relates in general to channel selection in communication systems, and more specifically to generating signals on selected channels to force the communication system to select a preferred set of channels so as to maximize the available channels for use.

BACKGROUND OF THE INVENTION

In a contemporary telephone system, a telephone user can address a radio telephone unit or a land-line telephone by entering a telephone number that corresponds to the phone system address of the individual to be contacted. Once a communication connection is complete, two way voice or data communication can take place.

However, with the growing use (system loading) of portable radio telephone (Cellular or Cordless Telephone Two (CT-2)) systems, there are primarily two conditions (problems) that can prevent the establishment of a radio frequency communication link with a base site (e.g., telepoint): all channels of the base site may be busy handling other calls, or the portable radio telephone attempting to access the base site may be out-of-range.

In typical CT-2 type communication systems, the number of available channels are limited, typically forty, and the receivers are designed with low adjacent channel selectivity (e.g., 20 dB), making it impossible to use adjacent channels at a single base site for communication. As a result, a base site cannot accommodate more than twenty contemporaneously active channels despite being equipped with forty channels. That is, conventional CT-2 communication systems can only support contemporaneous communication on one-half of the communication channels available for use.

Operationally, a CT-2 communication system requires each handset (communicator) originating a call to select a channel based on the lowest measured signal strength on all forty channels. Unfortunately, the somewhat random nature of the channel selection process may further reduce the number of channels available for use by a base site. That is, as the requirement for additional channels increases, the random channel selection process will often select two "in-use" channels having two "unused" adjacent channels therebetween. This problem is illustrated in FIGS. 1A and 1B.

Figures 1A, 1B:
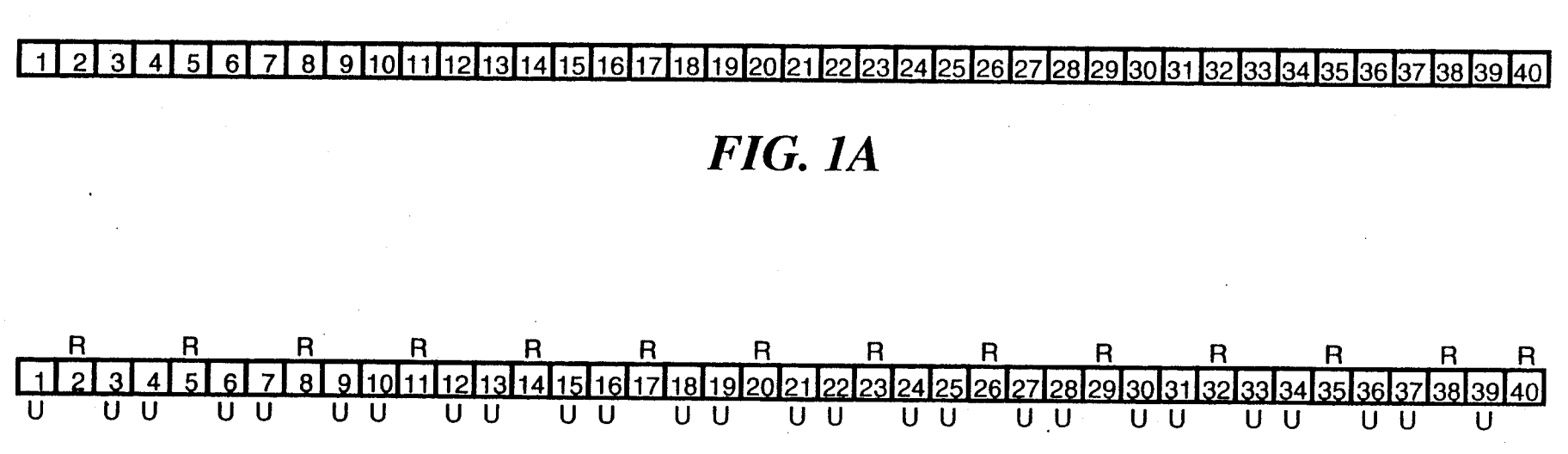

FIG. 1A shows a diagram of forty available channels, but because of the limits set by the low adjacent channel selectivity, the maximum number (best case) of channels available for use is twenty (i.e., using alternate channels). FIG. 1B, further illustrates the problem associated with the random selection of channels based on the lowest measured interference. According to the diagram, the worst case condition is shown, where:

R = Real signal (i.e., channels that are active);
U = Unusable adjacent channel.

When the "inuse" (active channels) are selected according to the positions R of FIG. 1B, the total available channels are reduced from twenty channels to fourteen channels. This is because the random selection process can only ensure that the channel being selected is not adjacent to an in-use channel. Thus, once a channel is determined to have the lowest signal strength, it is selected by a radio telephone so long as if it is not adjacent to an "inuse" channel. Regrettably, this process often results in two adjacent channels between two "inuse" channel, resulting the reduced availability of channels illustrated by FIG. 1B.

Thus, what is needed is a method for selecting communication channels that maximizes the number of contemporaneous available communication channels.

SUMMARY OF THE INVENTION

A communication system has at least one base site which includes a plurality of tranceivers operating on a plurality of communication channels for communicating to at least one of a plurality of communicators. The at least one base site comprises a generating means generating a plurality of interference signals according to a predetermined pattern on a subset of the plurality of communication channels. A processing means initiating and terminating communication between the base site and the at least one communicator on a selected communication channel substantially free of interference signals. The processing means further determines the communication channel being selected, and determines whether to change the predetermined pattern of the plurality of interference signals. The processing means, coupled to said generating means, steers other initiating communicators to communication channels substantially free of interference by altering the predetermined pattern of interference signals. The altering of the predetermined pattern comprises selectively enabling and disabling interference signals subsequent to the initiation and termination of the communication between the base site and the at least one communicator.

A method for allocating communication channels, comprising the steps of:
  (a) generating a plurality of interference signals in a predetermined pattern on a subset of communication channels of a plurality of communication channels;
  (b) assigning an initiating one of a plurality of communicators to a communication channel being substantially free of interference for communicating via the assigned communication channel;
  (c) removing selected interference signals in response to step (b); and
  (d) terminating communicating on the assigned channel; and (e) replacing the interference signals in response step (d) whereby the steps of removing and replacing further steer initiating communicators to select communication channels according to the pattern of interference signals being generated on the subset of the plurality of communication channels.

BRIEF DESCRIPTION OF THE DRAWINGS

FIG. 1A is an illustration of the total communication channels for a CT-2 communication system.

FIG. 1B is a block diagram illustrating the worst case reduction of available communication channels via conventional channel selection.

FIGS. 5A-5E are a series of illustrations depicting channel arrangement techniques in accordance with the present invention.

DESCRIPTION OF A PREFERRED EMBODIMENT

Figure 2:
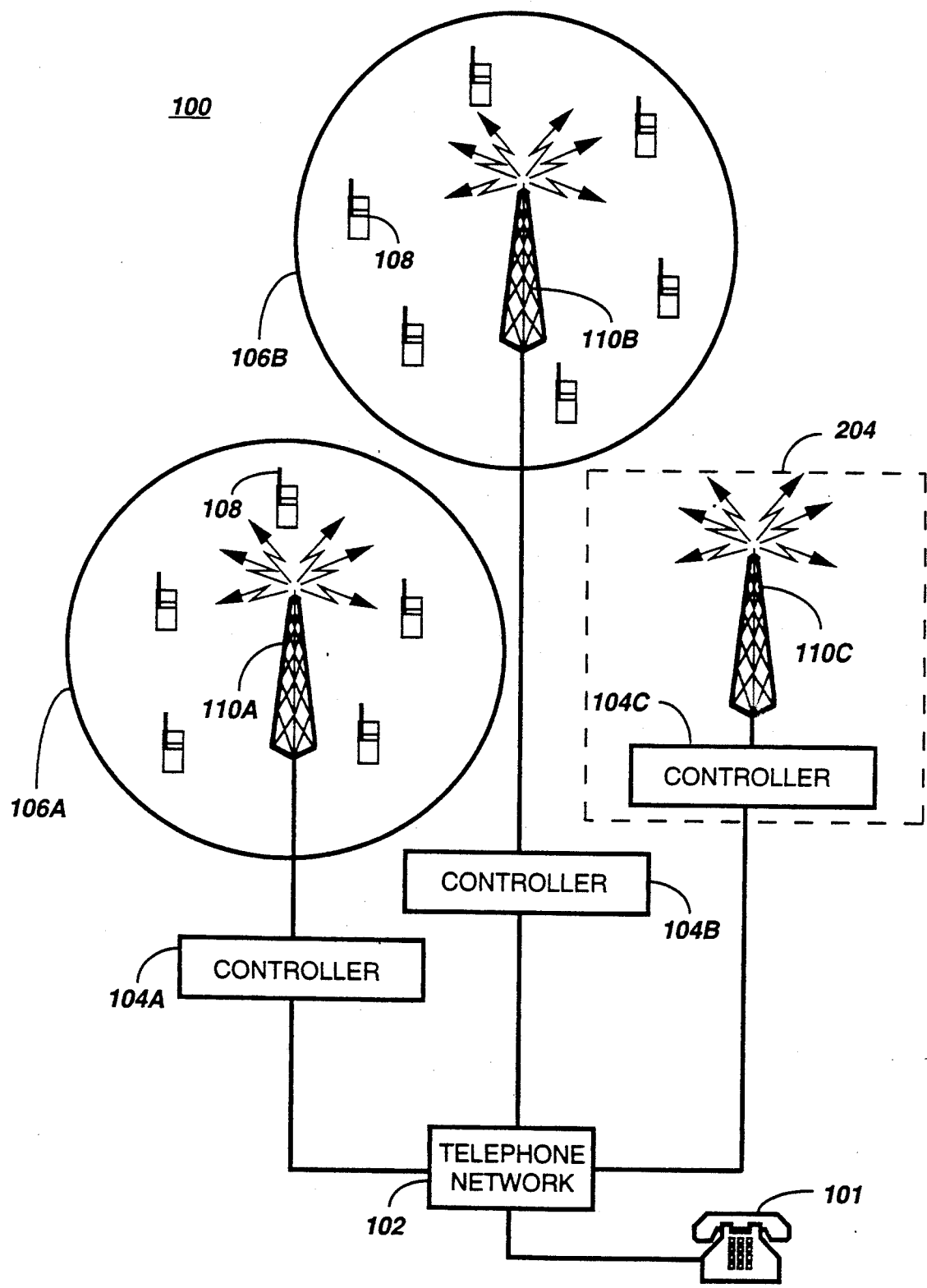
FIG. 2 is a block diagram of a communication system in accordance with the present invention.

As shown in FIG. 2, a communication system 100 comprises at least one telephone 101 coupled to a conventional public or private telephone network 102 as is known to those skilled in the art. The controllers 104A-C are contained within base sites (204 for example) that provide signals to three respective transmitters/receivers 110A, 110B, and 110C. The base sites 204 have an associated coverage area 106A and 106B into which the signal from the respective controller 104 is broadcast and received by at least one communicator 108. Once "contact" is established with the telephone network 102, the user can proceed with a two-way conversation. "Contact" is established by a user using a telephone 101 to dial a communicator 108 or alternately, using a communicator 108 to dial a telephone 101. Subsequent to the conventional means of verifying the dialed number, the telephone network via the base site selects an available communication channel to facilitate a link connection between the telephone 101 and the communicator 108.

Figure 3:
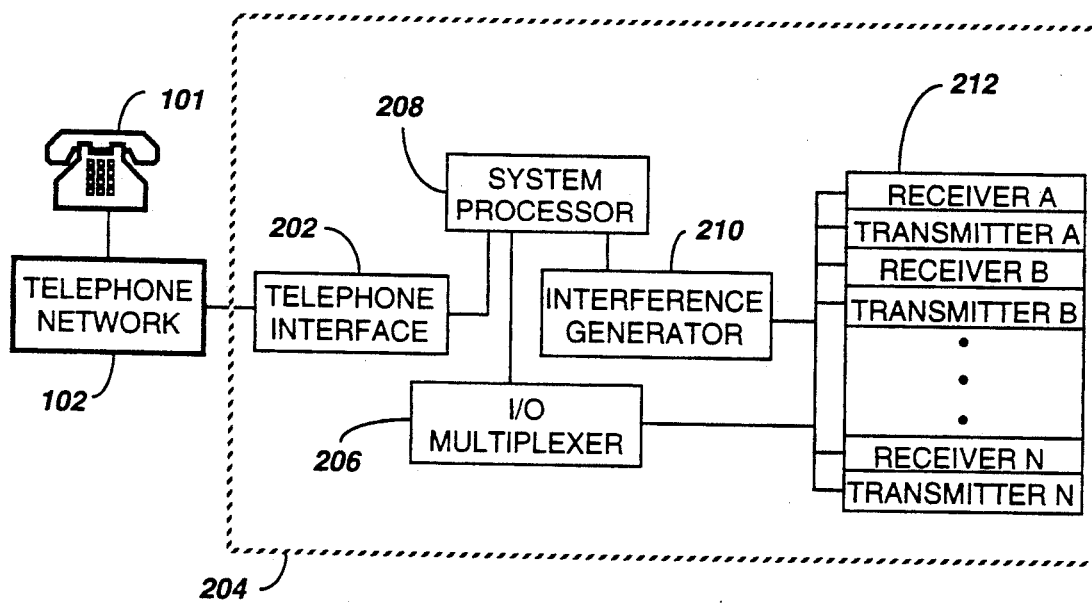
FIG. 3 is a block diagram of the base site of FIG. 2 coupled to a telephone network in accordance with the present invention.

Referring to FIG. 3, a block diagram is shown of a base site 204 coupled to the telephone network 102 and the telephone 101. The purpose of each base site is to establish and maintain (for the duration of a call) a communication link between the telephone 101 and a radio telephone (communicator) 108. The telephone 101 communicates with the base site 204 via a conventional public or private telephone network 102. The base station is capable of receiving a plurality of telephone links (or lines) using a telephone interface 202 that acts to route the incoming and outgoing traffic to a transmitter/receiver pair 212 as selected by a system processor 208. The system processor 208 controls the telephone interface 202 and allocates (via an I/O multiplexer 206) one transmitter/receiver pair 212 per incoming or outgoing telephone line. The transmitter/receiver pairs are part of a bank of frequency agile (preferably synthesized) modular transceivers 212 that can be easily expanded to meet the traffic demands for a particular system. In implementing a system that meets the CT-2 Common Air Interface (CAI) specifications, each transmitter/receiver pair must be capable of time division duplex (TDD) operation over the same radio frequency channel. TDD operation in a CT-2 application is defined by the alternate transmission and reception, by both the radio telephone and the selected transmitter/receiver pair at the base site 204, of radio frequency information packets (e.g., digital or analog modulation carrying voice or data information). That is, when one unit transmits, the other unit listens. The TDD information transfer method yields the equivalent to a full duplex communication link on a single radio frequency channel.

According to the invention, an interference generator 210 is controlled by the system processor 208, and operates to generate interference signals on selected channels. The system processor 208, with the inherent knowledge of the system configuration, places and removes interference signals according to the varying communications demand on the base site 204. This technique will be subsequently discussed in detail. In this way, the system processor 208 introduces interference signals on certain channels to force (or steer) the communicators 108 (see FIG. 2) to select communication channels so as to maximize the available channels. With this technique, the base site indirectly controls the channel selection, thus ensuring that channels are selected in such a fashion to reduce the probability of two adjacent unusable channels resulting therebetween two "inuse" channels.

Figure 4:
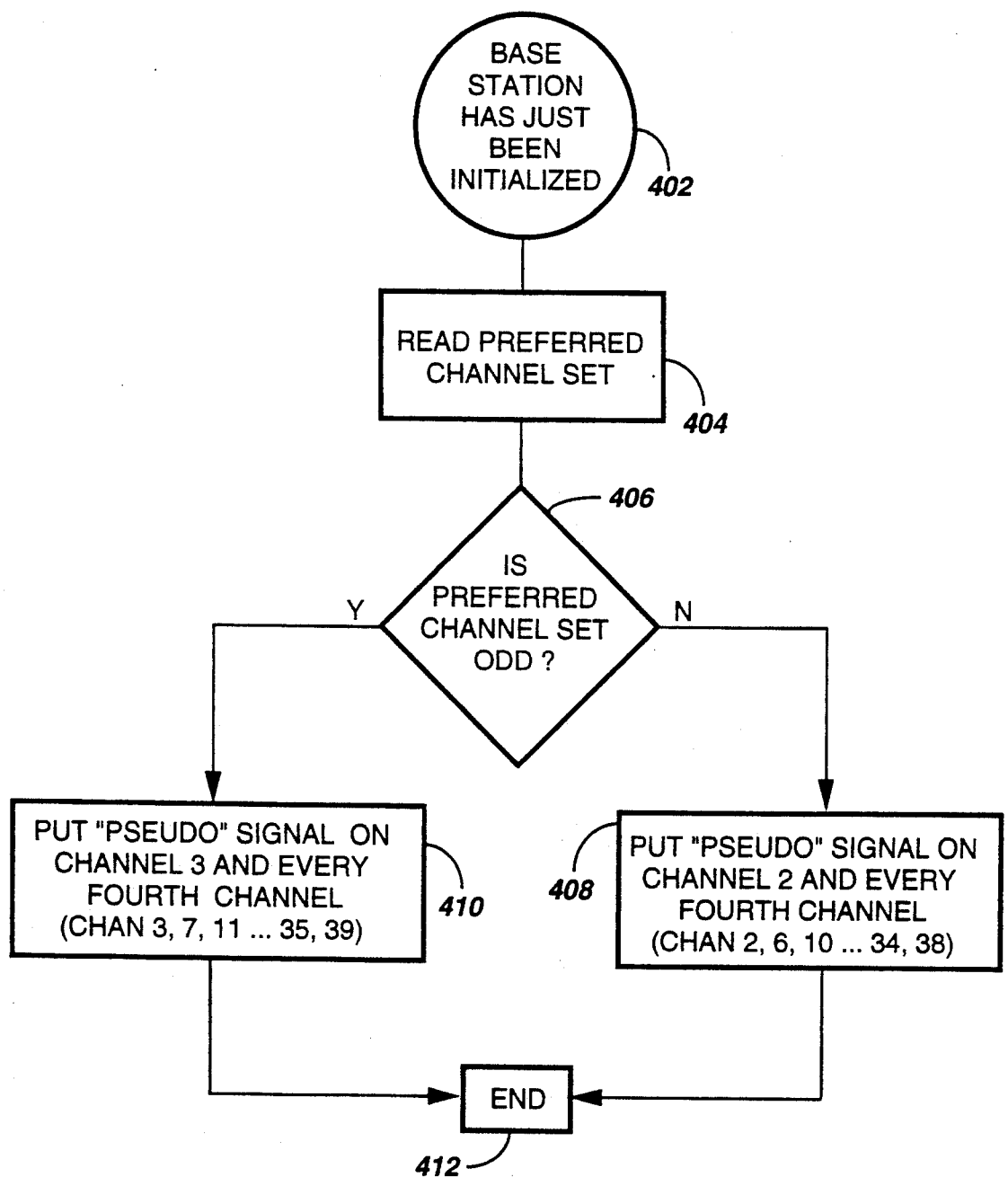
FIG. 4 is a flow diagram illustrating channel initialization procedure in accordance with the present invention.
Figures 5A, 5B, 5C, 5D, 5E:
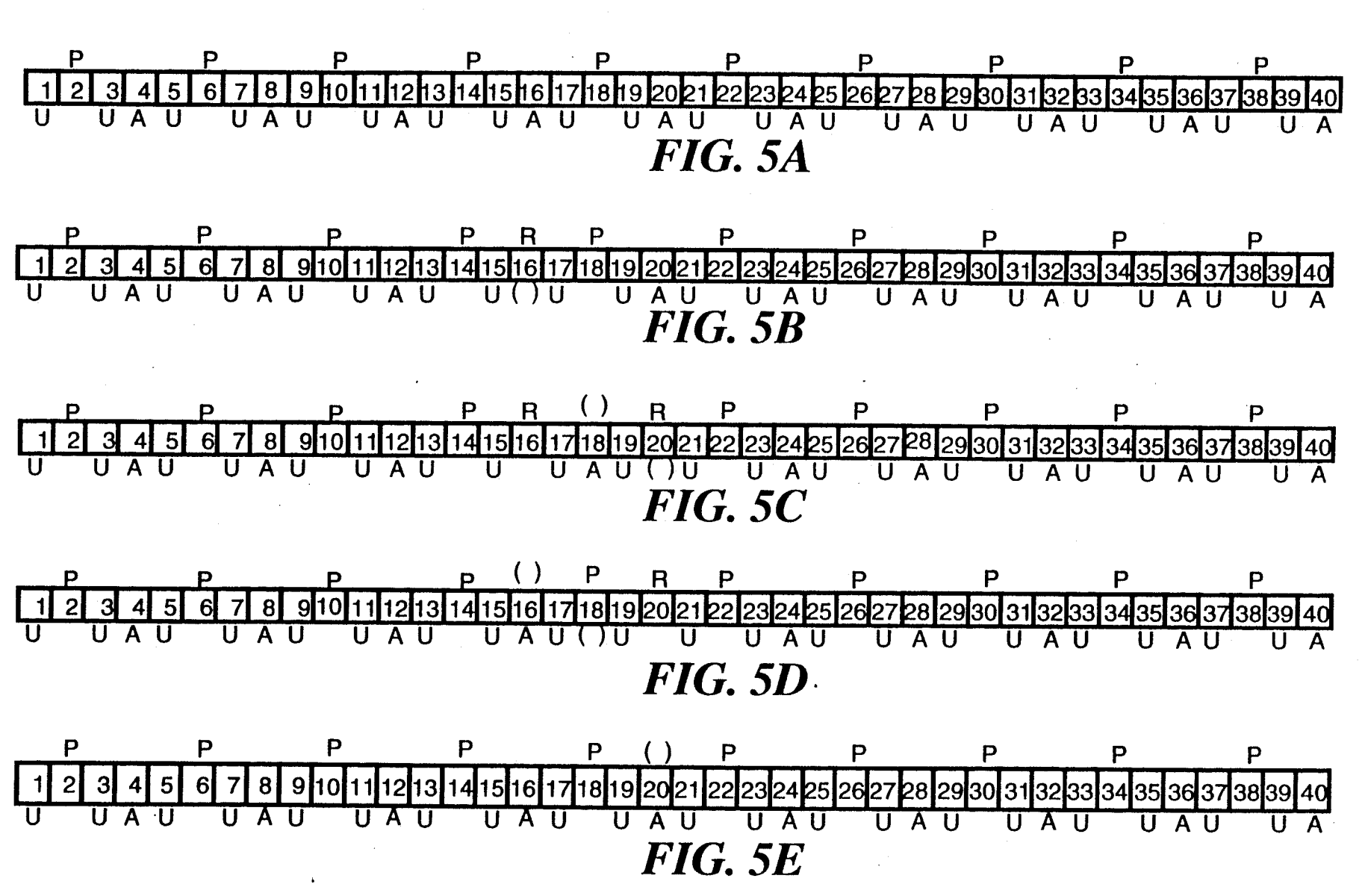

The initialization of the system configuration will be discussed in reference to FIG. 4 and FIG. 5A. The flow diagram of FIG. 4 illustrates the steps in accordance with the preferred initialization phase of the base site, which begins with step 402 after the initialization of the base site is completed. Subsequent to step 402, the system reads a preferred channel set (odd or even set) that may be stored in a memory (not shown), for example, in the system processor 208 (see FIG. 3). Preferably, there are two channel sets comprising either a odd or even channel set. The odd channel set is an arrangement of the odd-number channels for communication, and an even channel set is an arrangement of the even-number channels for communication. The channel set is checked to determine the preferred channel configuration (step 406). If the preferred channel set is even, the system configures the interference signals by generating an interference signal initially on channel 2 with the next subsequent interference signals being off-set every four channels (e.g., placing interference signals on channels 2, 6, 10, ..., 38) (step 408). Reference to FIG. 5A shows such an even channel configuration, where:

P = the positions of the interference signals according to the even configuration;

A = the positions available for channels assignment (a subset of the preferred channels);

U = the position that may not be readily chosen (unavailable channels) due to the co-channel interference of the interference signals.

Referring again to FIG. 4, when the preferred channel set is odd, the system proceeds according to step 410. In step 410, the interference signals are generated initially on channel 3 with the next subsequent interference signals being off-set every four channels (e.g., placing interference signals on channels 3, 7, 11, ..., 39). In this way, the generated interference signals are configured either in an odd or an even pattern. This technique forces the communicators to select available channels in accordance with the preferred pattern. In the preferred pattern (odd or even), certain channels are required to be selected first (i.e., the available channels), thus, preventing two "inuse" channels from being selected with two adjacent unused channels therebetween.

Figure 6:
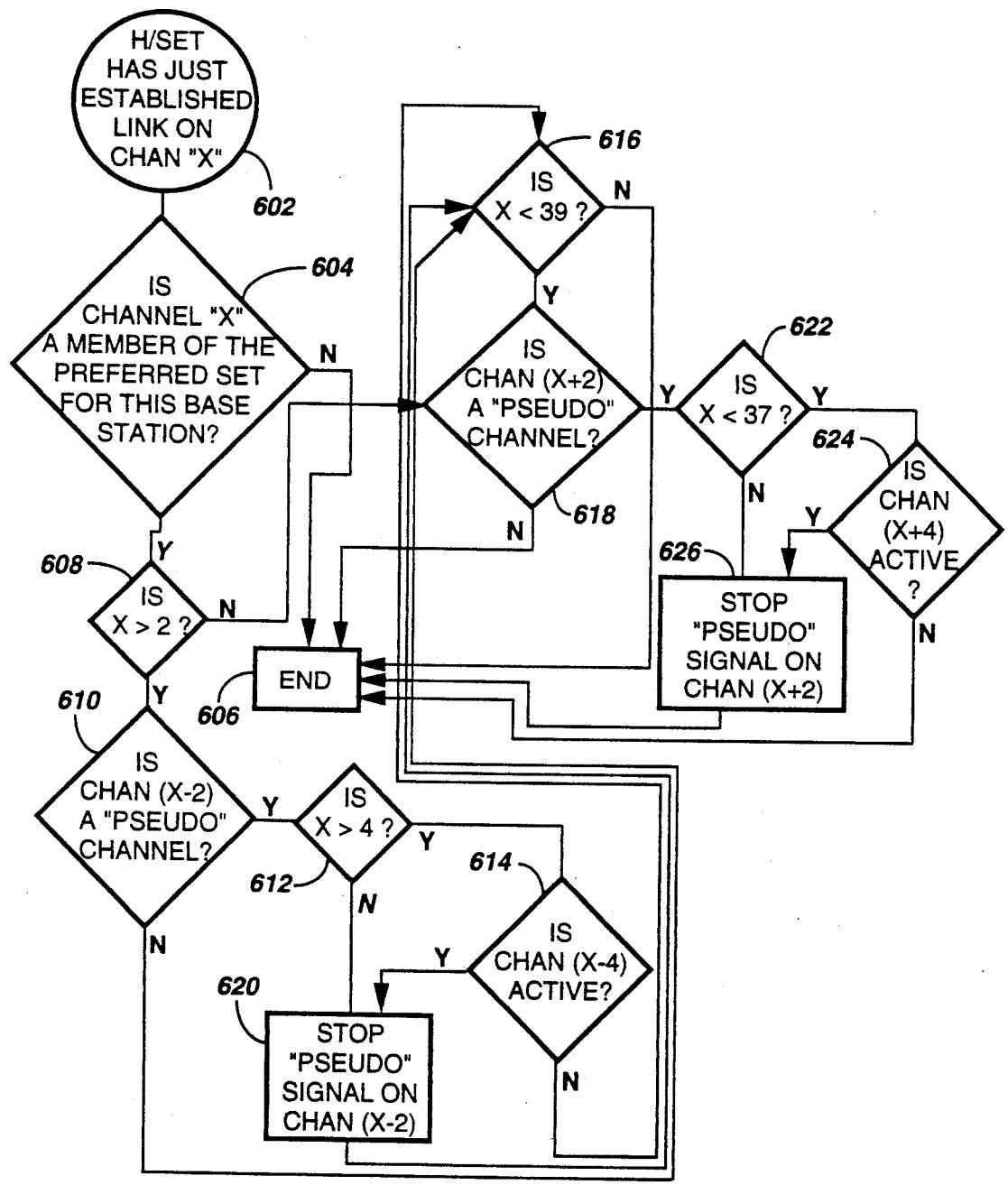
FIG. 6 is a flow diagram illustrating the preferred base site operation for removing interference signals to facilitate channel assignments in accordance with the present invention.

FIG. 6 shows the process of allocating channels in the preferred configuration (odd or even) in accordance with the present invention. After a link has been established on one of the available channels (X) (step 602), step 604 checks if the established link is on a preferred channel that is available in that preferred set for that base site. This double check, step 604, is preferred since if for some reason the communicator chooses the "wrong channel" (a channel not available in the configuration for that particular base station), the system will not try reallocate the available channels according to the chosen "wrong channel". Thus, the preferred system is able to determine, however improbable it may be, when a "wrong channel" or unavailable channel is selected to prevent the system from reallocating interference signals (step 606). Absent this knowledge, the system may lose its known interference signals positions, thereby resulting inefficient channel use.

Conversely, when the chosen link is a channel in the preferred set, step 604, the chosen channel number is checked to determine if it is greater than channel number 2 (step 608). If the channel is greater than 2, control is transferred to step 610. In step 610, channel number (X−2) is checked for the presence of an interference signal. The presence of an interference signal results in a further check of the link channel X to determine if it is greater than channel number 4 (step 612). If the chosen channel (X) is greater than channel number 4, then channel number (X−4) is checked to determine if it is in use (step 614). In the event that channel number (X−4) is inactive, the chosen channel X is checked to determine if it is less than channel number 39 (step 616). If the chosen channel (X) is equal to or greater than 39, the process ends (step 606).

Continuing from step 616, if the assigned channel X is less than 39, the process transfers control to step 618, which determines if channel number (X+2) has an interference signal. If there is no interference signal on channel number (X−2), the process ends (step 606). However, if an interference signal is on channel number (X+2), the chosen channel (X) is checked to determine if it is less than channel number 37 (step 622). If the chosen channel (X) is equal to or greater than channel number 37, the interference signal on channel number (X+2) is removed (step 626), and the process ends, step 606. Channel number (X+2) is now available for selection by the communicators. Proceeding from step 622, when the chosen channel (X) is less than channel number 37, channel number (X+4) is checked to determine if it is active (step 624). If channel number (X+4) is active, the interference signal is removed on channel number (X+2), thus making channel number (X+4) available for communication, and the process ends (step 606). However, if channel number (X+4) is inactive, the process ends (step 606).

Subsequent to step 612, if channel number (X−4) is active, step 614, the pseudo interference signal on channel (X−2) is removed (step 620). The process then transfers to step 616, and proceeds as discussed in the above description. Alternately, if the chosen channel (X) is less than or equal to channel number 4, the interference signal on channel number (X−2) is removed (step 620), and the process continues from step 616 as was previously described. Beginning from step 610, when there is no interference signal on channel number (X−2) the process similarly continues from step 616. Proceeding from step 608, when the chosen channel (X) is less than or equal to channel number 2, the process continues from step 618.

The process described from the flow diagram of FIG. 6 may also be explained by reference to the channel configuration illustrations in FIGS. 5A-5C. FIG. 5A shows the initial even channel configuration, where:

P = the generated pseudo interference signals;
A = channels available for assignment;
U = channels unavailable for present assignment; and
R = active channels.

FIG. 5B shows an already assigned channel R at channel number 16. Subsequent to the assignment of channel 16, channel 16 is removed from the available channel list. FIG. 5C illustrates a second assigned channel at channel 20. After assigning channel 20, the base site removes channel 20 from the list of available channels. Further checks as described above in FIG. 6, result in the removal of the interference signal from channel 18, thus, making channel 18 available for future assignment. In this way, the base site removes the interference signals in an orderly manner ensuring that the available channels will be efficiently selected and used.

Figure 7:
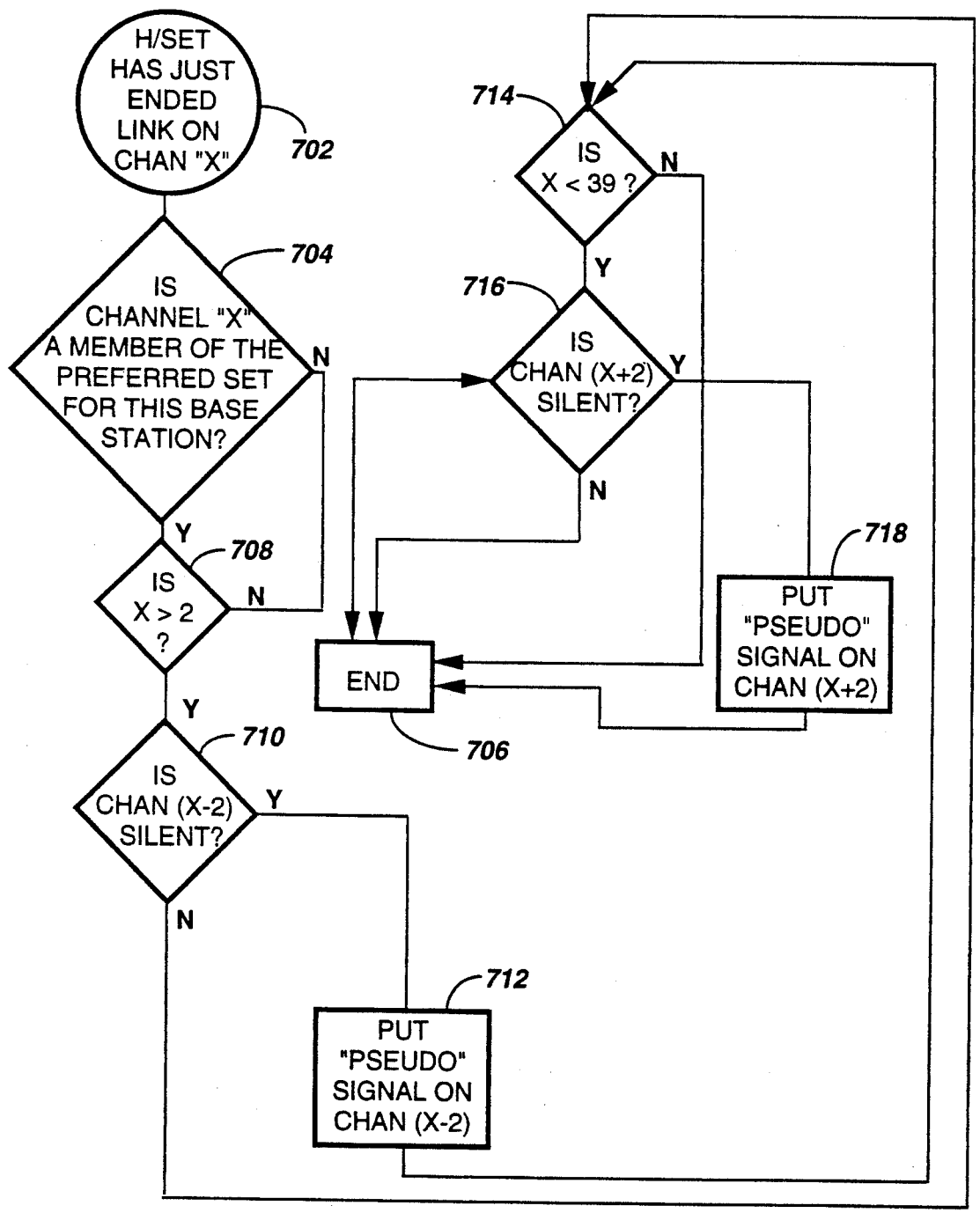
FIG. 7 is a flow diagram illustrating the preferred base site operations for replacing interference signals to facilitate channel de-assignments in accordance with the present invention.

Referring to FIG. 7, a flow diagram illustrates the operation of the base site subsequent to the communicator ending the use of a channel. In step 702, the channel (X) has become available since the hand set has ceased communication. The base site next checks if the newly available channel is a member of the preferred channel set (step 704). As was previously explained in FIG. 6, step 704 ensures that an inadvertent "wrong channel" selection does not cause the base site to reconfigure the interference signals. If the newly available channel (X) is not a member of the preferred channel, the process stops (step 706), thus preventing the system from reconfiguring the interference signals in accordance with the "wrong channel". Alternately, if the newly available channel (X) is a member of the preferred set, step 708 checks if channel X is greater than channel number 2. If so, then channel number (X−2) is checked to determine if it is available (i.e., not active or not currently assigned) (step 710). If channel number (X−2) is determined to be available, then an interference signal is placed on channel number (X−2) (step 712). Subsequent to starting the interference signal, step 714 further checks the newly available channel number X to determine if it is less than channel number 39. If not, the process ends (step 706). However, when channel X is less than 39, step 716 checks if channel number (X+2) is available. When channel number (X+2) is not available (active) the process ends (step 706), but if channel (X+2) is available, an interference signal is placed on channel (X+2) (step 718), and then the process ends (step 706). Continuing from step 710, if channel (X−2) is not available, the process transfers to step 714, and continues as previously described above. Finally, the alternate result from step 708, that is, channel X less-than-or-equal-to 2, the process continues to step 716, which follows the already described flow.

FIG. 5D illustrates the process described in FIG. 7. As shown, when the activity on channel 16 ends, channel 16 is placed in the available list of preferred channels. After channel 16 becomes available, the base site checks to verify that channel 18 is available, (i.e., channel (X+2), where X=16), and replaces the interference signal on channel 18 (see FIG. 5A). The base site also checks to determine if there is activity on channel 14, (i.e., channel number (X−2) where X=16). FIG. 5D show an interference signal present on channel number 14, therefore no further action is necessary. Further, FIG. 5E shows available channel 20 also becoming unavailable. This results in channel 20 being placed in the available channel list. The base site will then check to determine if interference signals are to be generated on selected channels to ensure that the communicators are forced to select (or steered to) the preferred channels in accordance with the present invention.

In this way, as the demand for channels decreases, the base site will replace the previously removed interference signals. The preferred channel configuration is maintained, in this case, an even configuration, thereby steering the communicators to select a preferred channel. This technique of generating interference on certain channels actually forces the communicators to select channels that maximizes the efficient use of the available channels. This results is the base site directly controlling how channels are selected by the communicators without direct communication between the base sites and the communicators.

Figure 8A:
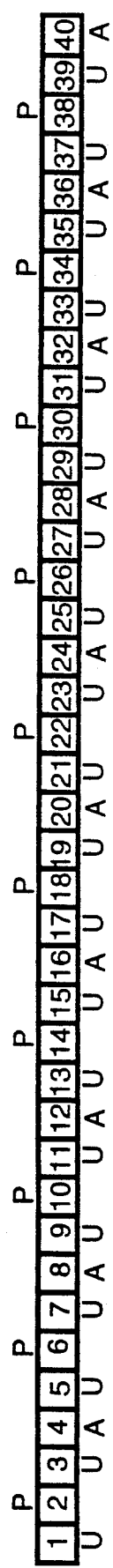
FIGS. 8A and 8B are illustrations of two preferred channel configurations in accordance with the present invention.
Figure 8B:
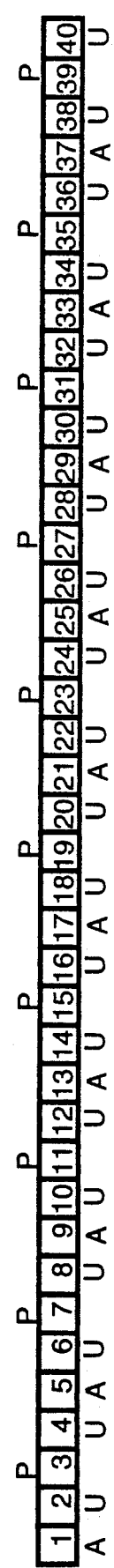
Figure 9:
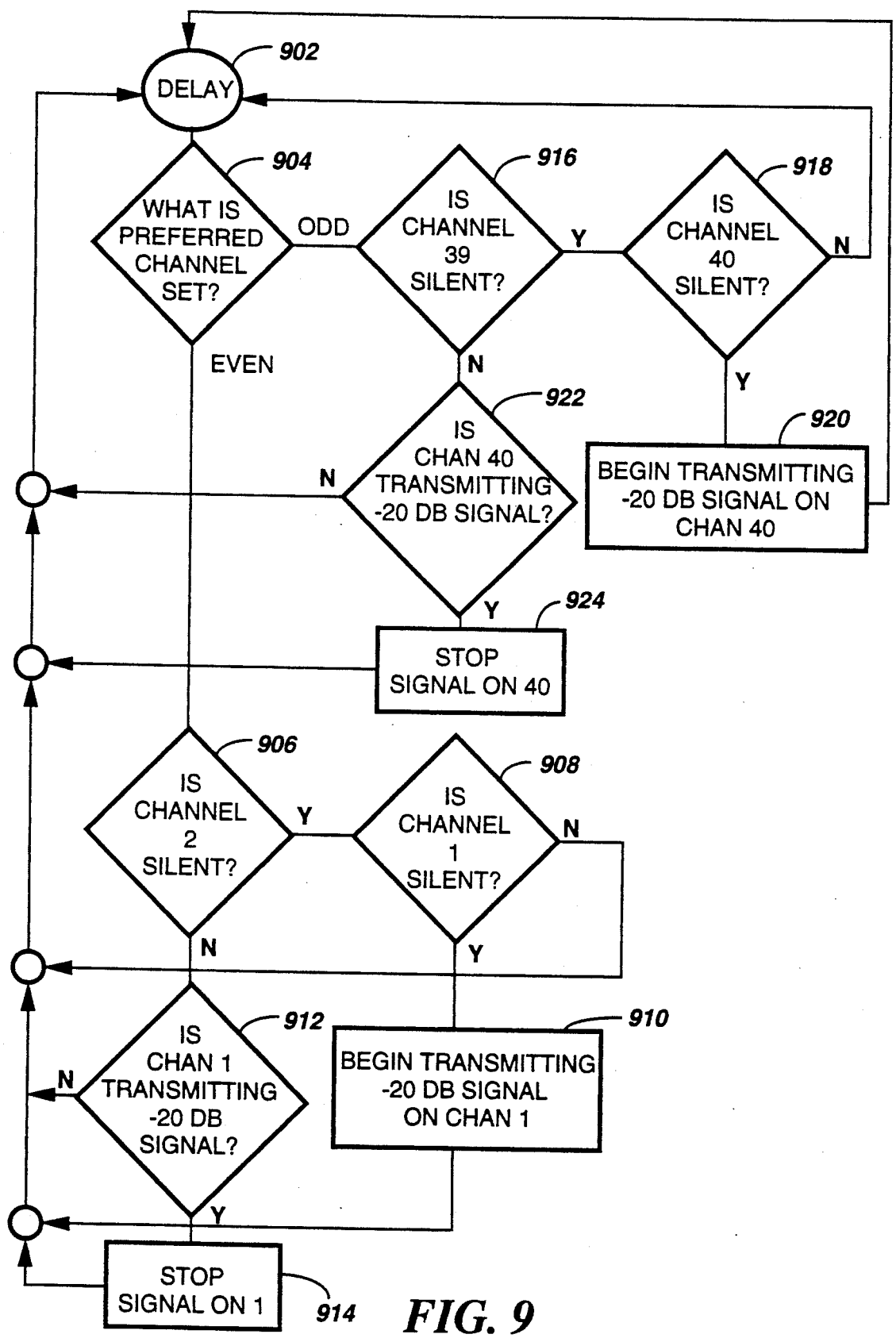
FIG. 9 is a flow diagram illustrating the preferred base site operation for ensuring that channel configurations are maintained according to the preferred configuration.

FIGS. 8A–B and 9 illustrate the additional steps to ensure that the preferred configurations (even or odd) are strictly maintained to enable contiguous operation of odd-even patterns of base sites. Contiguous operation includes at least two base sites with touching or overlapping coverage areas. When this arrangement is necessary, the preferred arrangement alternates base sites to have odd and even channel configurations. FIG. 8A illustrates the even channel configuration according to the present invention. According to the invention, when channel number 4 is selected, the base will subsequently remove the interference signal P from channel number 2. This leaves channel numbers 1 and 2 as viable channels for selection. However, the present invention contemplates that when the odd and even configurations are contiguously placed, the better choice is channel 2. (If channel 1 was chosen, the two channels resulting between channels 1 and 4 would be unavailable for use). Contiguous operation is achieved by placing adjacent base sites with alternate even and odd channel configurations. Thus, by selecting channel number 2 in an even configuration allows the odd configuration to be placed adjacent to the even configuration, because the odd configuration will assign channel number 1 for communication. In this way, by forcing the even channel set to make channel 1 unavailable (i.e., selecting channel 2), the combination of odd and even configurations will satisfy the requirement of one unused channel therebetween two active channels. The same checks are necessary in the odd configuration when channel number 37 becomes chosen in the odd configuration (FIG. 8B). Subsequent to the removal of the interference signal from channel number 39, the selection of channel 39 becomes the more efficient choice than channel 40.

The flow diagram of FIG. 9 illustrates the process involved in preserving the odd and even configurations for contiguous base sites. Subsequent to the delay, step 902, the current channel configuration is determined (step 904). Subsequent to the determination of an even configuration, step 906 checks if channel number 2 is available. If channel number 2 is available, step 908 further checks if channel 1 is available, and if channel 1 is not available, the process returns to the delay phase (step 902). However, if channel 1 is a available, step 910 starts the generation of a low signal strength signal (low power signal) on channel 1 (typically −20 dB), and then returns to the delay phase (step 902). The low power signal is preferably generated by the interference generator shown in FIG. 3. The low power signal increases the noise level sufficiently enough to for the communicator to select channel number 2 over channel number 1. However, the low power signal is sufficiently low enough to enable the communicator to select channel 2 even though it is adjacent to the dummy signal on channel 1. Continuing from step 906, if channel 2 is not available (i.e., its active), step 912 checks if channel 1 is transmitting a low power signal. If not, the process continues to the delay phase, step 902. Conversely, if there is a low power signal on channel 1 it is removed, step 914, and the process returns to step 902.

In this way, efficient selection between channels 1 and 2 of the even configuration is effected by the low power signal. However, when an actual signal is detected on channel 2, the low power signal is removed to improve the communication on channel 2. Subsequent to channel 2 becoming available (inactive), the low power signal is again placed on channel number 1 to ensure further efficient channel selection.

According to the flow diagram of FIG. 9, when the channel configuration is odd, step 916 checks if channel number 39 is available. If determined to be available, a low power signal is placed on channel 40, step 920, and then the process continues to the delay phase, step 902. Alternately, when channel number 39 is not available (i.e., active), step 922 checks if a low power signal is presently on channel 40. If there is no low power signal on channel 40, the process returns to the delay phase, step 902. However, when a low power signal is present on channel 40, it is removed, step 924, and the process returns to the delay phase, step 902.

In this way, efficient selection between channels 39 and 40 of the odd configuration is similarly effected by a low power signal. However, when an actual signal is detected on channel 39, the low power signal is removed to improve the communication on channel 39. Subsequent to channel 39 becoming available (inactive), the low power signal is again placed on channel 40 to ensure further efficient channel selection.

In summary, a communication system having at least one base site is coupled to a telephone system. Interference signals are generated on selected communication channels to force (steer) the communication system to assign a communicator to one of a set of a preferred channels. The interference signals are selectively removed upon increasing channel demand and selectively replaced upon decreasing channel demand in the communication system. In this way, the base site generates interferences on channels determined to be inappropriate for current selection. The interference signal strength is sufficiently strong to force the communicator, upon making a signal strength comparison, to select other available channels. The base site, using the knowledge that the communicator chooses a channel with the lowest measured interference, places interference signals on selected channels to directly control the communicator without directly communicating with the communicator.

I claim:

1. A communication system having at least one base site including a plurality of transceivers operating on a plurality of communication channels for communicating to at least one of a plurality of communicators, the at least one base site, comprising:

generating means for generating a plurality of interference signals according to a predetermined pattern on a subset of the plurality of communication channels;

processing means for initiating and terminating communication between the base site and the at least one communicator on a selected communication channel substantially free of interference signals, said processing means further determining the communication channel being selected, and for determining whether to change the predetermined pattern of said plurality of interference signals, said processing means, coupled to said generating means, for steering other initiating communicators to communication channels substantially free of interference by altering the predetermined pattern of interference signals, wherein the altering of the predetermined pattern comprises selectively enabling and disabling interference signals subsequent to the initiation and termination of the communication between the base site and the at least one communicator.

2. The communication system according to claim 1 wherein the plurality of interference signals are arranged according to an even pattern with the interference signals being selectively placed on even communication channels numbers and spaced every four channels apart.

3. The communication system according to claim 2 wherein the plurality of interference signals comprise a pseudo interference signal.

4. The communication system according to claim 1 wherein the plurality of interference signals are arranged according to an odd pattern with the plurality of interference signals being selectively placed on odd communication channels numbers and spaced every four channels apart.

5. The communication system according to claim 4 wherein the plurality of interference signals comprise a pseudo interference signal.

6. The communication system according to claim 1 wherein an interference signal is placed on a first communication channel of an even configuration and a last channel of an odd configuration to ensure that an adjacent channel is not selected.

7. A communication system including a base site, said base site comprising:

transmitting and receiving means for communicating with at least one of a plurality of communicators;

generating means for generating a plurality of interference signals;

processing means, coupled to the generating means, for steering at least one of a plurality of communicators to one of a selected subset of communication channels by selectively placing the generated interference signals according to a predetermined pattern on a subset of the plurality of communication channels said selected subset of channels being free of interference signals being generated; and said processing means further selectively disabling and enabling interference signals in response to initiating and terminating communication with at least one communicator whereby said selective enabling and disabling of interference signals steer initiating communicators to select communication channels according to a predetermined pattern for maximizing use of the plurality of communication channels.

8. The communication system according to claim 7 wherein the plurality of interference signals are arranged according to an even pattern with the plurality of interference signals being selectively placed on even communication channels numbers and spaced every four channels apart.

9. The communication system according to claim 8 wherein the plurality of interference signal comprise a pseudo interference signal.

10. The communication system according to claim 7 wherein the plurality of interference signals are arranged according to an odd pattern with the plurality of interference signals being selectively placed on odd communication channels numbers and spaced every four channels apart.

11. The communication system according to claim 10 wherein the plurality of interference signal comprises a pseudo interference signal.

12. The communication system according to claim 7 wherein an interference signal is placed on a first communication channel of an even configuration and a last channel of an odd configuration to ensure that an adjacent channel is not selected.

13. A method for allocating communication channels, comprising the steps of:

(a) generating a plurality of interference signals in a predetermined pattern on a subset of communication channels of a plurality of communication channels;

(b) assigning an initiating one of a plurality of communicators to a communication channel being substantially free of interference for communicating via the assigned communication channel;

(c) removing selected interference signals in response to step (b); and (d) terminating communicating on the assigned channel; and (e) replacing the interference signals in response step (d) whereby the steps of removing and replacing further steer initiating communicators to select communication channels according to the pattern of interference signals being generated on the subset of the plurality of communication channels.

14. A communication system having at least one base site including a plurality of transceivers operating on a plurality of communication channels for communicating to at least one of a plurality of communicators, the at least one base site, comprising:

means for generating a plurality interference signals and selectively placing the interference signals in an odd or even configuration on a plurality of contiguous communication channels;

processing means, coupled to the generating means, for steering a communicator initiating communication with the base site to communicate on a communication channel substantially free of interference according to the odd or even configuration; said processing means, comprising:

means further determining the communication channel being selected, and for determining whether to change the predetermined pattern of said plurality of interference signals;

means for removing the interference signals from at least one of the plurality of communication channels subsequent to assigning a communication channel in response to the determining means; and means for replacing the interference signals on the communication channels upon termination of the use of a communication channel in response to the determining means.

* * * * *